(12) United States Patent
Gutta et al.

(10) Patent No.: US 11,128,679 B2
(45) Date of Patent: Sep. 21, 2021

(54) REAL-TIME MEDIA STREAMS

(71) Applicant: Twilio Inc., San Francisco, CA (US)

(72) Inventors: Krishnaprasad Gutta, San Francisco, CA (US); Tyler Wells, Saratoga, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 16/985,600

(22) Filed: Aug. 5, 2020

(65) Prior Publication Data
US 2021/0044630 A1      Feb. 11, 2021

Related U.S. Application Data

(60) Provisional application No. 62/882,869, filed on Aug. 5, 2019.

(51) Int. Cl.
*G06F 15/16* (2006.01)
*H04L 29/06* (2006.01)
*H04L 29/08* (2006.01)

(52) U.S. Cl.
CPC .......... *H04L 65/1069* (2013.01); *H04L 65/60* (2013.01); *H04L 67/10* (2013.01); *H04L 67/146* (2013.01); *H04L 67/20* (2013.01)

(58) Field of Classification Search
None
See application file for complete search history.

(56) References Cited

U.S. PATENT DOCUMENTS

| 10,271,079 | B1 * | 4/2019 | Woschank | ......... H04N 21/4788 |
| 10,499,088 | B1 * | 12/2019 | Woschank | ......... H04N 21/2743 |
| 2020/0404036 | A1 * | 12/2020 | Cain | ..................... G06F 16/164 |
| 2021/0120315 | A1 * | 4/2021 | Makinen | ............ H04N 21/6131 |

* cited by examiner

*Primary Examiner* — Quang N Nguyen
(74) *Attorney, Agent, or Firm* — Schwegman Lundberg & Woessner, P.A.

(57) ABSTRACT

Disclosed are systems, methods, and non-transitory computer-readable media for providing real-time media streams. A cloud-based communication platform receives an incoming communication request to establish a communication session and executes a set of communication instructions associated with the incoming communication request. The set communication instructions includes a command to execute a real-time media stream in relation to the communication session. The command includes data designating a network destination to receive the real-time media stream. The cloud-based communication platform initiates the communication session between client devices and initiates the real-time media stream to the network destination. The real-time media stream concurrently transmitting at least a portion of the media transmitted between the client devices to the network destination.

16 Claims, 10 Drawing Sheets

REAL-TIME MEDIA STREAMS

CROSS-REFERENCE TO RELATED APPLICATIONS

This application claims the benefit of priority of U.S. Provisional Application No. 62/882,869, filed on Aug. 5, 2019, which is incorporated herein by reference in its entirety. This application is related to co-pending U.S. patent application titled "PROGRAMMABLE VOICE EXTENSION FRAMEWORK," U.S. application Ser. No. 16/985,624, filed on Aug. 5, 2020, which claims priority to U.S. Provisional Application No. 62/882,873, filed on Aug. 5, 2019, the contents of which are hereby incorporated by reference in their entireties.

TECHNICAL FIELD

An embodiment of the present subject matter relates generally to cloud-based communication services and, more specifically, to providing real-time media streams.

BACKGROUND

Communications have transformed rapidly in the past 10 years as traditional phone lines are replaced by Voice Over Internet Protocol (VoIP), instant messaging, video, etc. This transition to providing communications using the Internet has allowed Software as a Service (SaaS) providers to provide communication services for their clients. Providing communication as a service frees customers from having to purchase and manage the hardware needed to provide communications. While beneficial to customers, utilizing communication as a service also comes with some drawbacks as each customer has unique communication needs. For example, some customers may wish to provide transcription services or translation services for their voice communications, while other customers may not need these features. Currently, customers of communication SaaS providers are limited to the products provided by the SaaS provider. For example, the SaaS provider may have a limited set of available features from which their customers may choose. If a customer wants additional functionality that is not provided by the SaaS provider, the customer has no options but to wait until the SaaS provider makes new features available. This limits the customer's ability to implement the functionality they desire. Accordingly, improvements are needed.

SUMMARY

A cloud-based communication platform provides communication services for multiple accounts of the cloud-based communication platform. Each account may be associated with a different customer of the cloud-based communication platform (e.g., individual user, set of users, company, organization, online service, etc.). The cloud-based communication platform may provide a variety of cloud-based communication services, such as facilitating communication sessions (e.g., phone calls, messaging, and the like) between endpoints (e.g., client devices), managing incoming communication requests, routing communication requests to an appropriate endpoint, logging data associated with communication sessions, etc.

The cloud-based communication platform may allocate contact identifiers (e.g., phone numbers, URLs, and the like) to customers for use in facilitating communications. Communications directed to the contact identifiers are received and managed by the cloud-based communication platform according to configurations selected by the customer. For example, the customer may assign an allocated contact identifier to a specific client device causing communications directed to the contact identifier to be routed by the cloud-based communication platform to its assigned client device. As another example, the customer may assign an allocated contact identifier for use with their customer call center of the customer. As a result, the cloud-based communication platform may route communications directed to the allocated endpoint to one of the customer's available call center agents.

The communication services provided by the cloud-based communication platform may also be incorporated into a customer's application or website. For example, a customer that provides a ride sharing application may incorporate the communication services facilitated by the cloud-based communication platform into their application to enable users of the application to establish a communication session (e.g., phone call, chat session, etc.) with their assigned driver through use of the ride sharing application. As another example, a customer that provides a dating application may incorporate the communication services facilitated by the cloud-based communication platform to enable users of the dating application to establish communication session with other users.

Users of the application may not have knowledge that the communication services they are using through the application are being facilitated by the cloud-based communication platform. That is, the communication services may be presented as being a part of the application itself rather than provided by the cloud-based communication platform. In this way, the communication services facilitated by the cloud-based communication platform are provided as SaaS.

The cloud-based communication platform enables customers to configure performance of the communication services provided by the cloud-based communication platform by configuring a set of communication instructions dictating actions to be performed by the cloud-based communication platform in response to receiving an incoming communication associated with the customer. The set of communication instructions may include individual commands that dictate the actions to be performed by the cloud-based communication platform. For example, a customer may provide a set of communication instructions dictating actions to be performed by the cloud-based communication platform in response to receiving an incoming communication request (e.g., incoming call) directed to a contact identifier (e.g., phone number) allocated to the customer, such as directing the incoming communication to a specified client device.

The set of communication instructions may be a programming script that the cloud-based communication platform executes to perform the functionality desired by the customer. The programming script may be written in a scripting language (e.g., TwiML) provided by the cloud-based communication platform for use by its customers. For example, the scripting language may include specific commands for invoking a set of features and functionality provided by the cloud-based communication platform. Accordingly, a customer of the cloud-based communication platform uses the scripting language to generate a set of communication instructions to cause the cloud-based communication platform to perform the specified actions desired by the customer, such as connecting an incoming communication to a specified destination client device, invoking a feature provided by the cloud-based communication platform, and the like.

In some embodiments, the set of communication instructions may be provided to the cloud-based communication platform along with an incoming communication, such as an incoming communication request received from a customer computing system. As another example, a customer may upload a set of communication instructions to the cloud-based communication platform to be associated with the customer's account and/or specific endpoint identifiers allocated to the customer. As another example, the customer may provide the cloud-based communication platform with a resource identifier (e.g., Uniform Resource Identifier (URI)) that identifies a network location of the set of communication instructions.

In any case, the cloud-based communication platform accesses a set of communication instructions associated with an incoming communication request and executes the set of communication instructions to provide the functionality desired by the customer. In this way, the cloud-based communication platform allows for customization of the features and functionality it provides to its customers. For example, a customer may configure the set of communication instructions as desired to leverage the desired features and functionality provided by the cloud-based communication platform. Accordingly, the communication services provided by the cloud-based communication platform to each customer may vary based on each customer's specific needs.

While the set of features and functionality provided by the cloud-based communication platform may be sufficient for some customers, other customers may wish to implement features and functionality that are not yet provided by the cloud-based communication platform. To allow these customers to quickly implement the features and functionality they desire, the cloud-based communication platform provides for real-time media streams. Real-time media streams allow each customer to stream media transmitted as part of communication sessions to any selected network destination. The customer may then use the media as desired such as by storing the media for recording purposes and/or implementing desired functionality. For example, a customer may use the streamed media to implement transcription functionality that transcribes communications in real-time. As another example, a customer may use the streamed media to implement translation functionality that translates communications into a selected language. As another example, a customer may use the streamed media to implement an intent determination feature in which the intent of the communication is determined, and a response communication or recommendation is generated.

The real-time media stream may include any type of media transmitted as part of a communication session, such as voice, video, messaging, and the like. A communication session is any type of synchronous or asynchronous communication between two or more client devices (e.g., smart phones, laptops, computers, etc.), such as text communication, voice communication (e.g., phone call), video communication (e.g., video conference), etc. The media included in a real-time media stream may include all of the media data transmitted as part of the communication session (e.g., the raw stream of the media data) or a subset of the media data transmitted as part of the communication session, such as just the voice or video data transmitted as part of the communication session.

To implement a real-time media stream, a customer includes specified commands into the set of communication instructions provided to the cloud-based communication platform. When executed, the command instructs the cloud-based communication platform to initiate a real-time media stream to a defined network destination. For example, the command may include data defining the network destination to receive the real-time media stream, as well as data defining the media to be transmitted as part of the real-time media stream, and the like.

To provide further flexibility, the cloud-based communication platform allows for real-time media streams using a variety of media stream transports. A media stream transport is a communication protocol by which a media stream may be established to provide a media stream to a designated network destination. Examples of media stream transports include Websocket, Session Initiation Protocol (SIP), HTTP2, GRPC, etc. Customers can select the media stream transport used to establish the real-time media stream based on the specific needs of the customer and/or the specific capabilities of their systems. For example, a customer may designate the selected media stream transport in the set of communication instructions provided to the cloud-based communication platform.

Real-time media streams allow customers to develop and implement features for their unique needs. For example, a customer may develop an internal service to provide a desired feature, such as a transcription service, translation service, and the like. To implement the newly developed feature, a customer configures a set of communication instructions to cause the cloud-based communication platform to initiate real-time media streams to a network destination where the newly developed feature is implemented. For example, a customer that has developed a translation feature may instruct the cloud-based communication platform to initiate a real-time media stream to a customer computing system where the translation feature is hosted. The customer may then implement the translation feature on the media received via the real-time media stream. Through this process, customers can implement any desired functionality that they are able to develop, regardless of whether the functionality is provided by the cloud-based communication platform. Accordingly, customers are not limited to using only the features provided by the cloud-based communication platform.

To further enable customers to quickly add additional features to their communication services, the cloud-based communication platform allows customers to use real-time media streams to implement features developed by third-party developers. For example, third-party developers may develop features that may be shared or made available for purchase (e.g., through an app store, marketplace, etc.). A customer may choose to use a third-party feature to provide desired functionality rather than develop the feature in-house.

To utilize a third-party feature, a customer establishes a real time media stream to a network destination of the third-party where the third-party feature is implemented. To simplify this process, the cloud-based communication platform provides media stream connectors that allow for easy integration of third-party features. A media stream connector is a command provided by the third-party that a customer integrates into a set of communication instructions to integrate a feature provided by the third-party. For example, the media stream connector may cause a real-time media stream to be initiated to a network destination of the third. The cloud-based communication platform may provide an online resource (e.g., app store, online marketplace, etc.) through which customers may search for and download desired media stream connectors.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Figure 1:
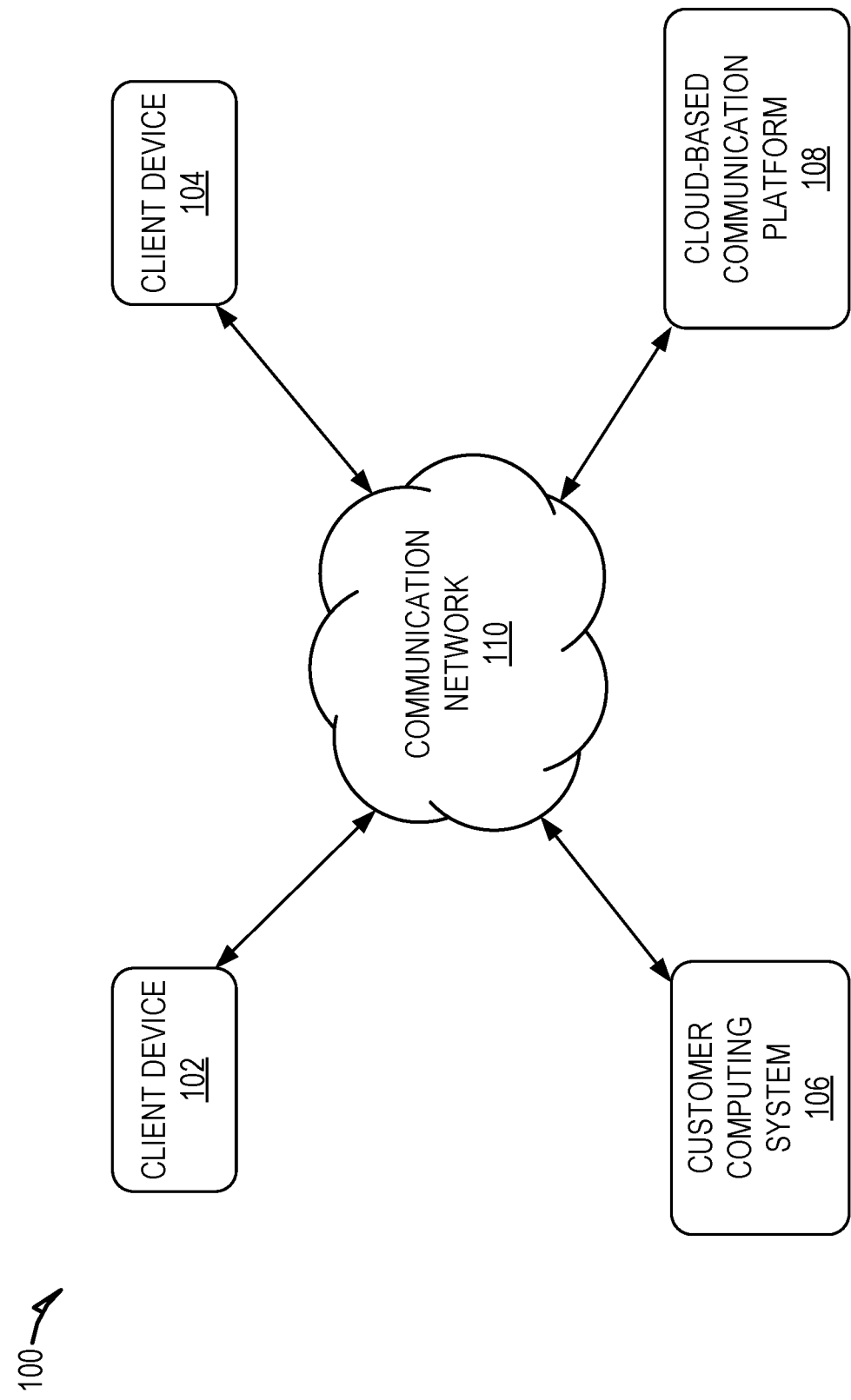
FIG. 1 shows an example system for providing real-time media streams, according to some example embodiments.

Disclosed are systems, methods, and non-transitory computer-readable media for providing real-time media streams. FIG. 1 shows an example system 100 for providing real-time media streams, according to some example embodiments. As shown, multiple devices (i.e., client device 102, client device 104, customer computing system 106, and cloud-based communication platform 108) are connected to a communication network 110 and configured to communicate with each other through use of the communication network 110. The communication network 110 is any type of network, including a local area network (LAN), such as an intranet, a wide area network (WAN), such as the internet, or any combination thereof. Further, the communication network 110 may be a public network, a private network, or a combination thereof. The communication network 110 is implemented using any number of communication links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1000 shown in FIG. 10.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The customer computing system 106 is one or more computing devices associated with a customer of the cloud-based communication platform 108. A customer may be any type of a person, entity, business, or the like, that utilizes the communication functionality of the cloud-based communication platform. For example, a customer may be a bank, retail store, restaurant, and the like.

In some embodiments, a customer may provide an online service that may be accessed by users via the communication network 110. In this type of embodiments, the customer computing system 106 may facilitate functioning of the provided online service. For example, users may use the client devices 102 and 104 that are connected to the communication network 110 to interact with the customer computing system 106 and utilize the online service. The online service 106 may be any type of service provided online, such as a ride-sharing service, reservation service, retail service, news service, etc.

Although the shown system 100 includes only two client devices 102, 104 and one customer computing system 106, this is only for ease of explanation and is not meant to be limiting. One skilled in the art would appreciate that the system 100 can include any number of client devices 102, 104 and/or customer computing systems 106. Further, the customer computing system 106 may concurrently accept connections from and interact with any number of client devices 102, 104. The customer computing system 106 may supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with the customer computing system 106 via a client-side application installed on the client devices 102 and 104. In some embodiments, the client-side application includes a component specific to the online service provided by the customer computing system 106. For example, the component may be a stand-alone application, one or more application plug-ins, and/or a browser extension. However, the users may also interact with the customer computing system 106 via a third-party application, such as a web browser, that resides on the client devices 102 and 104 and is configured to communicate with the online service 106. In either case, the client-side application presents a user interface (UI) for the user to interact with the customer computing system 106 to utilize the provided online service. For example, the user interacts with the customer computing system 106 via a client-side application integrated with the file system or via a webpage displayed using a web browser application.

The cloud-based communication platform 108 provides communication services for multiple accounts of the cloud-based communication platform 108. Each account may be associated with a different customer of the cloud-based communication platform 108 (e.g., individual user, set of users, company, organization, online service, etc.). The cloud-based communication platform 108 may provide a variety of cloud-based communication services, such as facilitating communication sessions (e.g., phone calls, messaging, and the like) between endpoints (e.g., client devices), managing incoming communication requests, routing communication requests to an appropriate endpoint, logging data associated with communication sessions, etc. A communication session is any type of communication between two or more client devices 102, 104. For example, a communication session may be a synchronous communication session, such as a voice communication session (e.g., phone call), video communication session (e.g., video conference), and the like. A communication session may also be an asynchronous communication session, such as text communication, chat session, and the like.

The cloud-based communication platform 108 may allocate contact identifiers (e.g., phone numbers, URLs, and the like) to customers for use in facilitating communications. Communications directed to the contact identifiers are received and managed by the cloud-based communication platform 108 according to configurations selected by the customer. For example, the customer may designate an allocated contact identifier to a specific client device 102 causing communications directed to the contact identifier to be routed by the cloud-based communication platform 108 to its designated client device 102. As another example, the customer may designate an allocated contact identifier to a customer call center. As a result, the cloud-based communication platform 108 may route communications directed to the allocated endpoint to one of the customer's available call center agents.

The cloud-based communication platform 108 may also provide customers with an Application Programing Interface (API) that enables the customers to programmatically communicate with and utilize the functionality of the cloud-based communication platform 108. The API may include specific API commands to invoke specified functionality of the cloud-based communication platform 108. For example, the API may define the syntax and format for the API command, including the parameters to include in the API command to initiate the desired functionality, such as initiating a communication session (e.g., phone call, chat session), transmitting an email message, and the like.

A customer may use the API to directly communicate with an utilize the communication serviced provided by the cloud-based communication platform 108. For example, a customer may use the API to transmit API commands from the customer computing system 106 to the cloud-based communication platform 108 to cause performance of specified functionality, such as initiating a communication session, transmitting an email, and the like.

A customer may also use the API provided by the cloud-based communication platform 108 to incorporate the communication services provided by the cloud-based communication platform 108 into the customer's application or website. For example, the customer may include API commands from the API into the source code of the programming application and/or website to cause the application and/or website to communicate with the cloud-based communication platform 108 to provide communication services provided by the cloud-based communication platform 108.

As an example, a customer that provides an online service such as a ride sharing application may utilize the communication services provided by the cloud-based communication platform 108 to enable users and drivers of the ride sharing application to communicate with each other. For example, the ride sharing application may include a user interface element that may be selected by a user to initiate a communication session with their driver. Selection of the user interface element may cause the customer computing system 106 to transmit an API command to the cloud-based communication platform 108 to initiate a communication session between client devices 102, 104 of the user and driver. Similarly, a customer that provides a dating application may utilize the communication services provided by the cloud-based communication platform 108 to enable users of the dating application to communicate with each other.

Users of the application may not have knowledge that the communication services they are using through the application are being facilitated by the cloud-based communication platform 108. That is, the communication services may be presented as being a part of the application itself rather than provided by the cloud-based communication platform 108. In this way, the communication services facilitated by the cloud-based communication platform 108 are provided as a SaaS.

The cloud-based communication platform 108 enables customers to configure performance of the communication services provided by the cloud-based communication platform 108. For example, the cloud-based communication platform 108 allows its customers to configure a set of communication instructions dictating actions to be performed by the cloud-based communication platform 108 in response to receiving an incoming communication associated with the customer. The set of communication instructions may include individual commands that dictate the actions to be performed by the cloud-based communication platform 108. For example, a customer may provide a set of communication instructions dictating actions to be performed by the cloud-based communication platform 108 in response to receiving an incoming communication request (e.g., incoming call) directed to a contact identifier (e.g., phone number) allocated to the customer's account, such as directing the incoming communication to a specified client device 102.

The set of communication instructions may be a programming script that the cloud-based communication platform 108 executes to perform the functionality desired by the customer. The programming script may be written in a scripting language (e.g., TwiML) provided by the cloud-based communication platform 108 for use by its customers. For example, the scripting language may include specific commands for invoking a set of features and functionality provided by the cloud-based communication platform 108. Accordingly, a customer of the cloud-based communication platform 108 uses the scripting language to generate a set of communication instructions to cause the cloud-based communication platform 108 to perform the specified actions desired by the customer, such as connecting an incoming communication to a specified destination client device 102, invoking a feature provided by the cloud-based communication platform 108, and the like.

In some embodiments, the set of communication instructions may be provided to the cloud-based communication platform 108 along with an incoming communication, such as an incoming communication request received from a customer computing system 106. As another example, a customer may upload a set of communication instructions to the cloud-based communication platform 108 to be associated with the customer's account and/or specific endpoint identifiers allocated to the customer. As another example, the customer may provide the cloud-based communication platform 108 with a resource identifier (e.g., Uniform Resource Identifier (URI)) that identifies a network location of the set of communication instructions.

In any case, the cloud-based communication platform 108 accesses a set of communication instructions associated with an incoming communication request and executes the set of communication instructions to provide the functionality desired by the customer. In this way, the cloud-based communication platform 108 allows for customization of the features and functionality it provides to its customers. For example, a customer may configure the set of communication instructions as desired to leverage the desired features and functionality provided by the cloud-based communication platform 108. Accordingly, the communication services provided by the cloud-based communication platform 108 to each customer may vary based on each customer's specific needs.

While the set of features and functionality provided by the cloud-based communication platform 108 may be sufficient for some customers, other customers may wish to implement features and functionality that are not yet provided by the cloud-based communication platform 108. To allow these customers to quickly implement the features and functionality they desire, the cloud-based communication platform 108 provides for real-time media streams.

Real-time media streams allow each customer to stream media transmitted as part of communication sessions facilitated by the cloud-based communication platform 108 to a selected network destination. The customer can then use the media as desired such as by storing the media for recording purposes and/or implementing desired functionality. For example, a customer may use the streamed media to implement transcription functionality that transcribes communications in real-time. As another example, a customer may use the streamed media to implement translation functionality that translates communications into a selected language. As another example, a customer may use the streamed media to implement an intent determination feature in which the intent of the communication is determined, and a response communication or recommendation is generated.

The real-time media stream may include any type of media transmitted as part of a communication session, such as voice, video, messaging, and the like. The media included in a real-time media stream may include all of the media data transmitted as part of the communication session (e.g., the raw stream of the media data) or a subset of the media data transmitted as part of the communication session, such as just the voice or video data transmitted as part of the communication session.

To implement a real-time media stream, a customer includes specified commands into the set of communication instructions provided to the cloud-based communication platform 108. When executed, the command instructs the cloud-based communication platform 108 to initiate a real-time media stream to a defined network destination. For example, the command may include data defining the network destination to receive the real-time media stream, as well as data defining the media to be transmitted as part of the real-time media stream, and the like. The network destination may be any computing device or devices in network communication with the cloud-based communication platform 108. For example, the network destination may be a computing device or computing devices included in the customer computing system 106.

A customer may configure the command into the set of communication resources to cause initiation of a real-time media stream in a manner desired by the customer. For example, the command may be implemented to automatically initiate a real-time media stream in response to occurrence of a selected action or event, such as a communication session being initiated, or a specified type of communication session being initiated. In one example, the customer may configure the set of communication instructions to initiate a real-time media stream to a transcription service for each communication session initiated between a user and one of the customer's call-center agents. Alternatively, the customer may configure the set of communication instructions to initiate a real-time media stream in response to receiving a designated command, such as one of the customer's call-center agent's providing a command to initiate a translation service.

To provide further flexibility, the cloud-based communication platform 108 allows for real-time media streams using a variety of media stream transports. A media stream transport is a communication protocol by which a media stream may be established to provide a media stream to a designated network destination. Examples of media stream transports include Websocket, Session Initiation Protocol (SIP), HTTP2, GRPC, etc. Customers can select the media stream transport used to establish the real-time media stream based on the specific needs of the customer and/or the specific capabilities of their systems. For example, a customer may designate the selected media stream transport in the set of communication instructions provided to the cloud-based communication platform 108.

Real-time media streams allow customers to develop and implement features for their unique needs. For example, a customer may develop an internal service to provide a desired feature, such as a transcription service, translation service, and the like. To implement the newly developed feature, a customer configures a set of communication instructions to cause the cloud-based communication platform 108 to initiate real-time media streams to a network destination where the newly developed feature is implemented. For example, a customer that has developed a translation feature may instruct the cloud-based communication platform 108 to initiate a real-time media stream to a customer computing system 106 where the translation feature is hosted. The customer may then implement the translation feature on the media received via the real-time media stream. Through this process, customers can implement any desired functionality that they are able to develop, regardless of whether the functionality is provided by the cloud-based communication platform 108. Accordingly, customers are not limited to using only the features provided by the cloud-based communication platform 108.

To further enable customers to quickly add additional features to their communication services, the cloud-based communication platform 108 allows customers to use real-time media streams to implement features developed by third-party developers. For example, third-party developers may develop features that may be shared or made available for purchase (e.g., through an app store, marketplace, etc.). A customer may choose to use a third-party feature to provide desired functionality rather than develop the feature in-house.

To utilize a third-party feature, a customer establishes a real time media stream to a network destination of the third-party where the third-party feature is implemented and potentially integrates the functionality of the third-party into the application or services of the customer. To simplify this process, the cloud-based communication platform 108 provides media stream connectors that allow for easy integration of third-party features. A media stream connector is a command or set of commands that enables a customer to utilize a feature provided by the third party. For example, the media stream connected is written using the scripting language (e.g., TwiML) provided by the cloud-based communication platform 108. A customer may simply add the media stream connecter into a set of communication instructions associated with the customer's account to integrate the feature provided by the third-party into their communication services. For example, the media stream connector may cause the cloud-based communication service 108 to initiate a real-time media stream to a network destination of the third-party, where the third-party feature is provided.

The cloud-based communication platform 108 may provide an online resource (e.g., app store, online marketplace, etc.) through which customers may search for and download desired media stream connectors. A customer wishing to implement a third-party service may navigate to the online resource (e.g., marketplace) provided by the cloud-based communication platform 108, where the media stream connector associated with the third-party service may be accessed and/or implemented into communication services provided to the customer. For example, the media stream connector may be downloaded and/or installed into a set of communication instructions associated with the customer's account. As another example, source code of the media stream connector may be copied from the marketplace and pasted or otherwise transferred into the set of communication instructions associated with the customer's account.

In some embodiments, the media stream connector is the entirety of the programming code used to initiate a media stream to a third-party system. For example, the media stream connector provides the entirety of the commands, parameters, etc., to cause initiation of a media stream to the third-party service. Alternatively, the commands, parameters, etc., to cause initiation of a media stream to the third-party service are stored in a command code registry of the cloud-based communication platform 108 and the media stream connector code includes a unique identifier that references the corresponding code stored in the command code registry. Using a command code registry to implement a real-time media stream may simplify the process by which customer implement features provided by a third-party.

Figure 2:
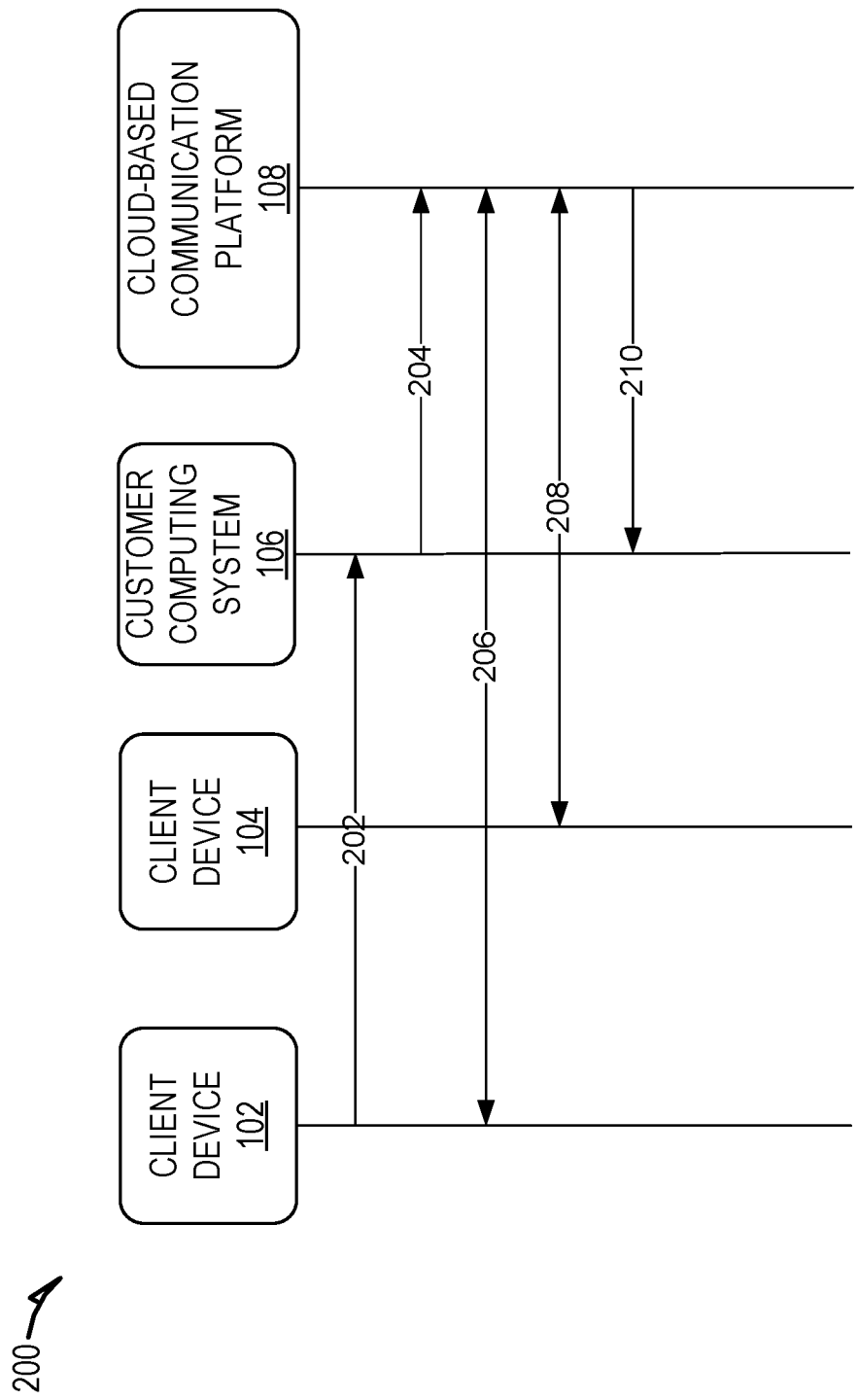
FIG. 2 shows communications in a system for initiating a real-time media stream, according to some example embodiments.

FIG. 2 shows communications in a system 200 for initiating a real-time media stream, according to some example embodiments. As shown, the system 200 includes two client devices 102, 104, a customer computing system 106 and a cloud-based communication platform 108. The cloud-based communication platform 108 may provide communication services for the customer associated with the customer computing system, such as by initiating communication sessions, transmitting email, and the like, As shown, the client device 102 may transmit a command 202 to the customer computing system 106 to initiate a communication session with another client device 104. The command 202 may be transmitted through use of an online service provided by the customer, such as a ride sharing service, banking service, and the like. The online service may utilize communication services provided by the cloud-based communication platform 108, such as initiating calls, text messages, or the like. For example, the customer's application may include user interface elements that a user may select to initiate a communication session. Accordingly, the command 202 may be initiated as a result of a user selecting a user interface element provided as part of the customer's online service.

In response to receiving the command 202, the online service 106 transmits a communication request 204 to the cloud-based communication platform 108 to initiate a communication session between the client devices 102, 104. The communication request 204 may be an API command based on an API provided by the cloud-based communication platform 108. The communication request 204 may include data identifying the client device 102 that initiated the request 202, as well as a destination client device 104.

In response to receiving the communication request 204, the cloud-based communication platform 108 accesses a set of communication instructions associated with the communication request 204. The set of communication instructions dictates actions to be performed by the cloud-based communication platform 108 in response to receiving the communication request 204. For example, the set of communication instructions may include commands to initiate a communication session between the client devices 102, 104 identified in the communication request 204. The set of communication instructions may also include a command to initiate a real-time media stream to a specified network destination.

In some embodiments, the set of communication instructions may be provided to the cloud-based communication platform 108 along with the communication request 204 received from the customer computing system 106. For example, the communication request 204 may include the set of communication instructions in the communication request 204. Alternatively, the cloud-based communication platform 108 may access the set of communication instructions from a data storage of the cloud-based communication platform 108. For example, a customer may provide the set of communication instructions to the cloud-based communication platform 108, which is then stored in the data storage and associated with the customer's account and/or specific endpoint identifiers allocated to the customer.

In some embodiments, the cloud-based communication platform 108 may access the set of communication instructions from a network location defined by the customer. For example, the customer may provide the cloud-based communication platform 108 with a resource identifier (e.g., Uniform Resource Identifier (URI)) that identifies the network location from which the set of communication instructions may be accessed. The customer may provide the resource identifier to the cloud-based communication platform 108 where it is stored in the data storage and associated with the customer's account and/or specific endpoint identifiers allocated to the customer. Alternatively, the resource identifier may be provided to the cloud-based communication platform 108 in the communication request 204 received from the customer computing system 106. In any case, the cloud-based communication platform 108 uses the resource identifier to access the set of communication instructions from the identified network location.

The cloud-based communication platform 108 executes the set of communication instructions, including a command to initiate the communication session between the client devices 102, 104 and a command to initiate the real-time media stream. Accordingly, the cloud-based communication platform 108 initiates a communication session between the two client devices 102, 104. For example, the cloud-based communication platform 108 initiates a first communication channel 206 with the first client device 102 and a second communication channel 208 with the second client device 104. Each communication channel 206, 208 allows the cloud-based communication platform 108 to transmit media to and receive media from one of the client devices 102, 104. For example, the cloud-based communication platform 106 receives media from and transmits media to a first client device 102 via the communication channel 206 initiated with the client device 102. Likewise, the cloud-based communication platform 106 receives media from and transmits media to the second client device 104 via the communication channel 208 initiated with the second client device 104. To facilitate the communication session between the client devices 102, 104, the cloud-based communication platform 108 receives media from each client device 102, 104 that is transmitted as part of the communication session and then relays the received media to the other client device 102, 104.

In addition to establishing a communication session, the cloud-based communication platform 108 also establishes a real-time media stream 210 with the customer computing system 106. The real-time media stream 210 provides the customer computing system 106 with a stream of media transmitted as part of the communication session between the two client devices 102, 104. The cloud-based communication platform 108 may initiate the real-time media stream 210 according to the set of communications instructions, such as by using a media stream transport designated in the set of communications instructions, as well as stream types of media specified in the set of communications instructions, such as all media, voice, messaging, video, etc.

The customer may use the media received via the real-time media stream 308 for any of a variety of purposes. For example, the customer may choose to store the media for recording purposes, implement a service, such as a transcription or translation service, use the media to train a machine learning or artificial intelligence model, analyze the media to determine an intent of the communications, and the like. In some embodiments, the customer computing system 106 may provide an output based on the media received as part of the real-time media stream 308. For example, the customer computing system 106 may generate recommended responses to messages, which may be provided to a client device 102.

Figure 3:
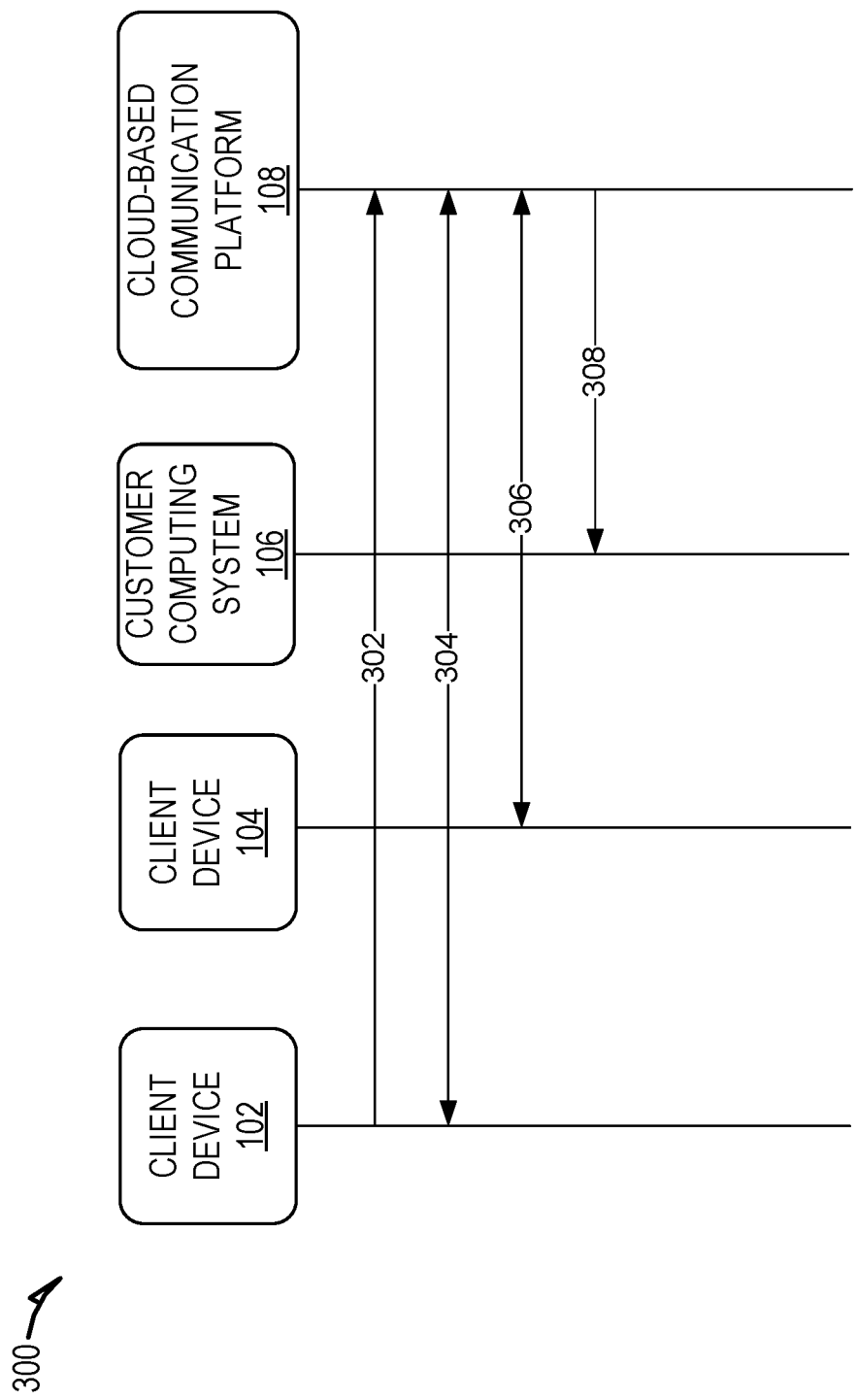
FIG. 3 shows communications in a system for initiating a real-time media stream, according to some example embodiments.

FIG. 3 shows communications in a system 300 for initiating a real-time media stream, according to some example embodiments. As shown, the client device 102 transmits a communication request 302 to the cloud-based communication platform 108. This is in contrast to the system 200 shown in FIG. 2, in which the communication request 204 is received from the customer computing system 106. In the embodiments shown in FIG. 3, the client device 102 uses a contact identifier (e.g., phone number) allocated to a customer of the cloud-based communication platform 108 to cause transmission of the communication request. For example, a user of the client device 102 uses the contact identifier to initiate a call, which is directed to the cloud-based communication platform 108 by the telecommunication carrier associated with the client device 102. Accordingly, the communication request 302 is received from the telecommunication carrier of the client device 102 via a public switched telephone network (PSTN).

In response to receiving the communication request 302, the cloud-based communication platform 108 accesses a set of communication instructions associated with the communication request 302. In this type of embodiment, the cloud-based communication platform 108 uses the contact identifier used to initiation the communication request 302 to identify the set of communication instructions. For example, the customer that was allocated the contact identifier may provide the cloud-based communication platform 108 with the set of communication instructions or a network identifier identifying the location of the set of communication instructions, which may be stored by cloud-based communication platform 108 and associated with the contact identifier and/or the customer's account. Accordingly, the cloud-based communication platform 108 uses the contact identifier (e.g., phone number) used to initiation the communication request 302 to identify the set of communication instructions.

The cloud-based communication platform 108 executes the set of communication instructions, which includes a command to route the incoming communication request 302 to a specified recipient client device 104, as well as a command to initiate the real-time media stream. Accordingly, the cloud-based communication platform 108 initiates a communication session between the client device 102 from which the communication request 302 was received and the specified recipient client device 104. For example, the cloud-based communication platform 108 initiates a first communication channel 304 with the first client device 102 and a second communication channel 306 with the second client device 104. Each communication channel 304, 306 allows the cloud-based communication platform 108 to transmit media to and receive media from one of the client devices 102, 104. For example, the cloud-based communication platform 106 receives media from and transmits media to a first client device 102 via the communication channel 304 initiated with the client device 102. Likewise, the cloud-based communication platform 106 receives media from and transmits media to the second client device 104 via the communication channel 306 initiated with the second client device 104. To facilitate the communication session between the client devices 102, 104, the cloud-based communication platform 108 receives media from each client device 102, 104 that is transmitted as part of the communication session and then relays the received media to the other client device 102, 104.

In addition to establishing a communication session, the cloud-based communication platform 108 also establishes a real-time media stream 308 with the customer computing system 106. The real-time media stream 308 provides the customer computing system 106 with a stream of media transmitted as part of the communication session between the two client devices 102, 104. The cloud-based communication platform 108 may initiate the real-time media stream 308 according to the set of communications instructions, such as by using a media stream transport designated in the set of communications instructions, as well as stream types of media specified in the set of communications instructions, such as all media, voice, messaging, video, etc.

The customer may use the media received via the real-time media stream 308 for any of a variety of purposes. For example, the customer may choose to store the media for recording purposes, implement a service, such as a transcription or translation service, use the media to train a machine learning or artificial intelligence model, analyze the media to determine an intent of the communications, and the like. In some embodiments, the customer computing system 106 may provide an output based on the media received as part of the real-time media stream 308. For example, the customer computing system 106 may generate recommended responses to messages, which may be provided to a client device 102.

Figure 4:
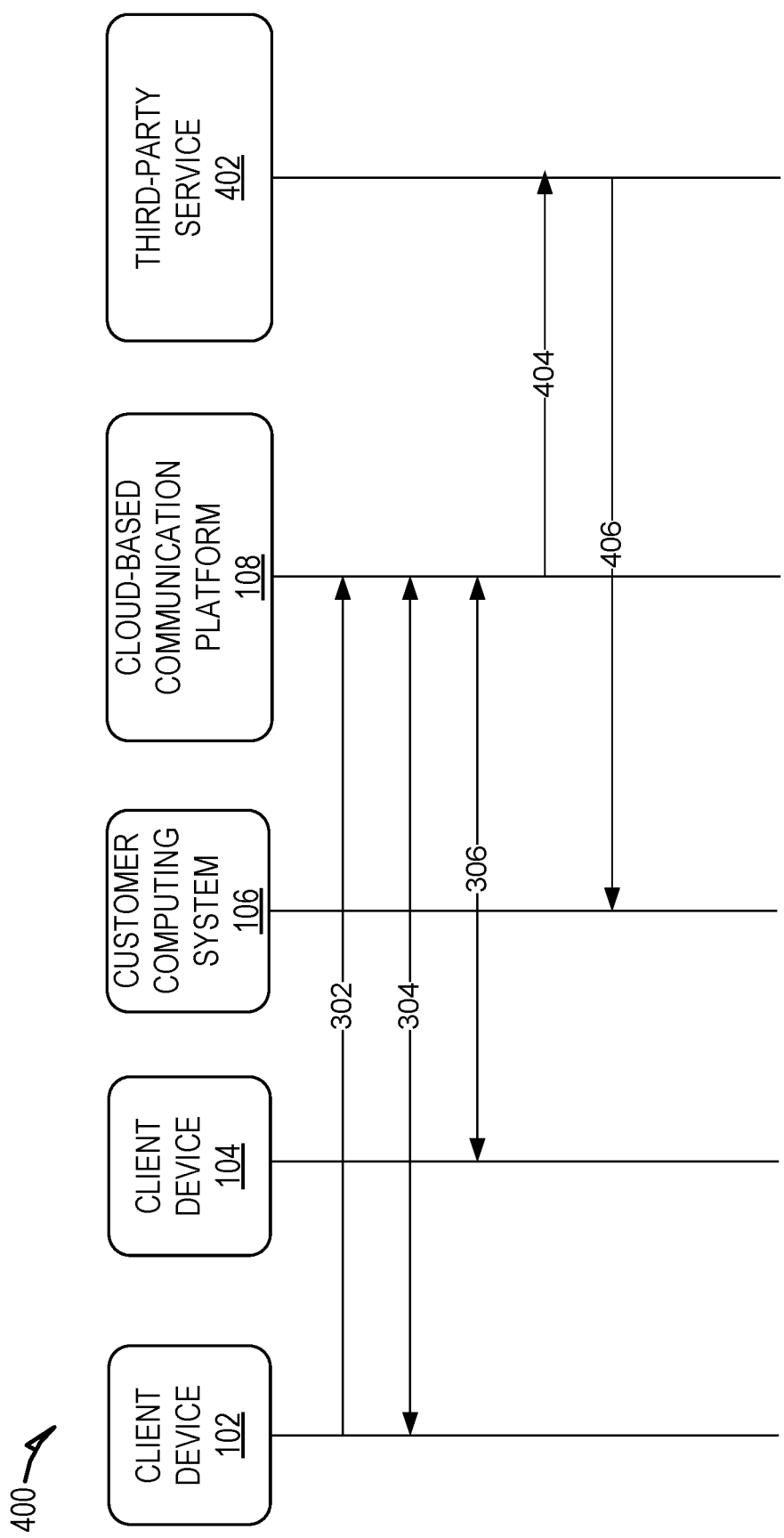
FIG. 4 shows communications in a system for initiating a real-time media stream, according to some example embodiments.

FIG. 4 shows communications in a system 400 for initiating a real-time media stream, according to some example embodiments. The system 400 shown in FIG. 4 is similar to the system 300 shown in FIG. 3 in that the client device 102 transmits a communication request 302 to the cloud-based communication platform 108, causing the cloud-based communication platform 108 to establish a communication session between the client devices 102, 104. In contrast to FIG. 3, however, in FIG. 4 the cloud-based communication platform 108 establishes a real-time media stream 404 with a third-party service 402, rather than with the customer computing system 106. For example, a customer of the cloud-based communication platform 108 may choose to implement a third-party feature provided by the third-party service rather than develop the feature in-house. The customer may configure the set of communication instructions to cause the cloud-based communication platform to initiate the real time media stream 404 to the third-party service, where the third-party service is provided.

In some embodiments, the third-party service 402 may provide a data output 406 back to the customer computing system 106. For example, the data output 406 may include a transcription or translation generated based on the media received by the third-party service 402 as part of the real-time media stream 404.

Figure 5:
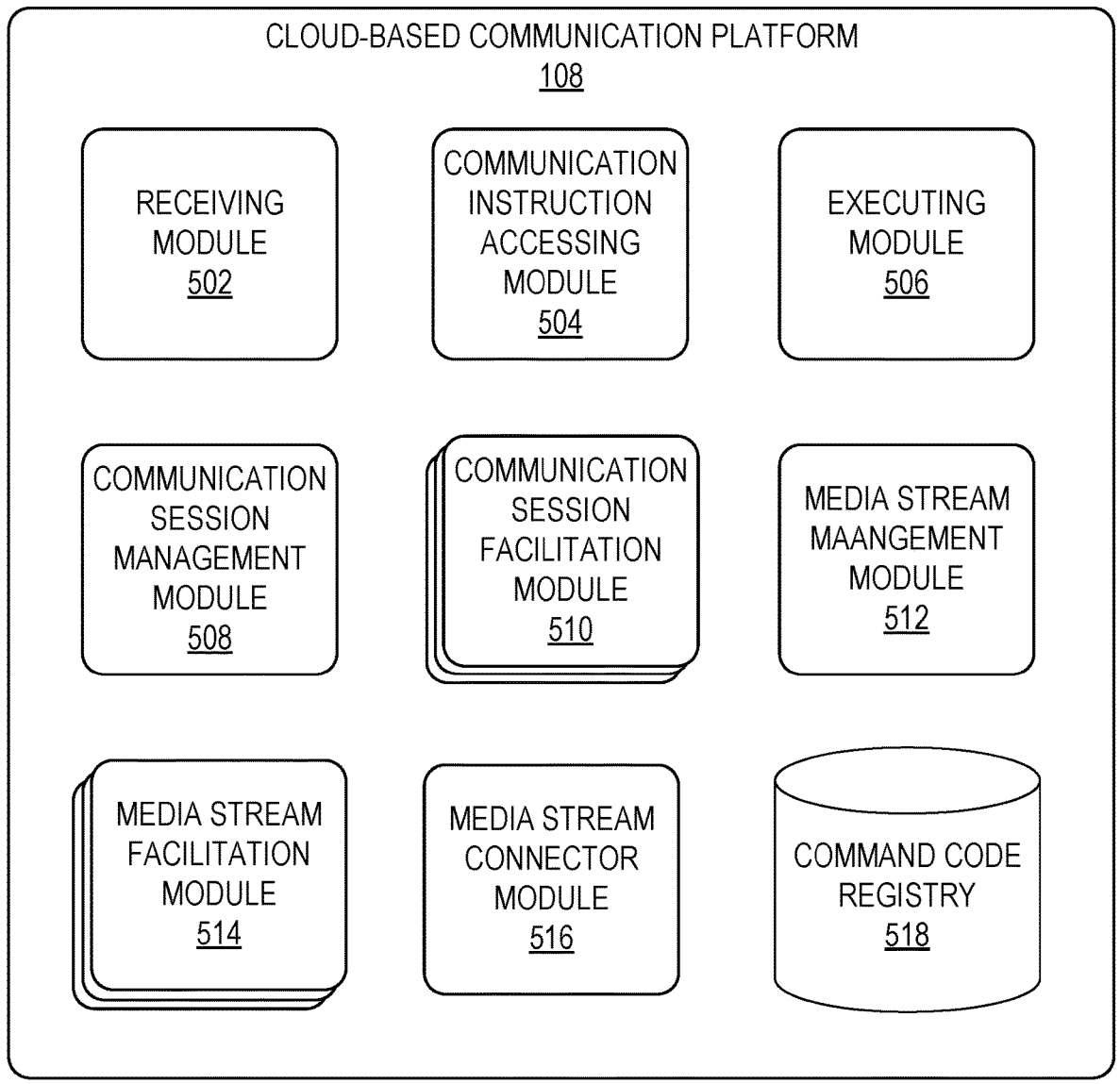
FIG. 5 is a block diagram of a cloud-based communication platform, according to some example embodiments.

FIG. 5 is a block diagram of a cloud-based communication platform 108. To avoid obscuring the inventive subject matter with unnecessary detail, various functional components (e.g., modules) that are not germane to conveying an understanding of the inventive subject matter have been omitted from FIG. 5. However, a skilled artisan will readily recognize that various additional functional components may be supported by the cloud-based communication platform 108 to facilitate additional functionality that is not specifically described herein. Furthermore, the various functional modules depicted in FIG. 5 may reside on a single computing device or may be distributed across several computing devices in various arrangements such as those used in cloud-based architectures.

As shown, the cloud-based communication platform 108 includes a receiving module 502, a communication instruction accessing module 504, an executing module 506, a communication session management module 508, a communication session facilitation module 510, a media stream management module 512, a media stream facilitation module 514, and a media stream connector module 516, and a command code registry.

The receiving module 502 receives incoming communication requests to establish communication sessions. An incoming communication request may be initiated by a customer or by an end user. For example, the receiving module 502 may receive an incoming communication request from a customer computing system 106 associated with a customer of the cloud-based communication platform 108. In this type of embodiment, the incoming communication request may be initiated programmatically, such as by using an Application Programming Interface (API) command. For example, the cloud-based communication platform 108 may provide and make available an API that enables its customers to communicate with and utilize the functionality of the cloud-based communication platform 108. The provided API includes individual API commands, such as an API command to transmit a communication request to the cloud-based communication platform 108.

The customer computing system 106 may transmit a communication request to the cloud-based communication platform 108 in response to receiving a request from a user of an application provided by the customer. For example, the application may include functionality that enables its users to initiate a communication session. Examples of this may include a ride-sharing application enabling users to initiate communication sessions with their assigned driver, a banking application enabling users to initiate communication sessions with agents, a travel application enabling users to initiate communication sessions with a call center, and the like. A user of a customer application may use a client-side application (e.g., app, web browser, etc.) executing on a client device 102 to communication with the customer computing system 106 and utilize the functionality of the application, including initiating a communication session. For example, the user may select a user interface element, such as a button, provided in the customer application to initiate a communication session, thereby causing the client device 102 to transmit a command to the customer computing system 106. In response to receiving the command, the customer computing system 106 may then transmit the communication request to the cloud-based communication platform 108.

The customer computing system 106 may also transmit a communication request to the cloud-based communication platform 108 without receiving a command from a user's client device 102. For example, a customer may wish to initiate a call with a user. In this type of situation, the customer computing system 106 may transmit a communication request to the cloud-based communication platform 108 to initiate the desired communication session.

In some embodiments, the incoming communication request may be received directly from an end user rather that from the customer computing system 106. For example, a user may use a contact identifier (e.g., phone number) allocated to a customer of the cloud-based communication platform 108 to initiate a communication session. Accordingly, the incoming communication request may be received from a telecommunication carrier associated with the client device 102 via a public switched telephone network (PSTN).

In some embodiments, the incoming communication request may include additional data for use by the cloud-based communication platform 108. For example, incoming communication requests that are received programmatically from a customer computing system 106 using an API command may include data for use by the cloud-based communication platform 108 in managing/directing the incoming communication request. This may include a unique identifier associated with the customer and/or an account of the customer, a set of communication instructions for managing the incoming communication session, and/or a resource identifier identifying a location of the set of communication instructions.

The receiving module 502 may communicate with and/or share data with the other modules of the cloud-based communication platform 108. For example, the receiving module 502 may notify the communication instruction accessing module 504 that an incoming communication request has been received, as well as provide the communication instruction accessing module 504 with any related data. This may include providing the communication instruction accessing module 504 with the contact identifier (e.g., phone number) used to initiate the incoming communication request and/or any data received along with the incoming communication request, such as the unique identifier associated with the customer and/or an account of the customer, the set of communication instructions for managing the incoming communication session, and/or a resource identifier identifying a set of communication instructions.

The communication instruction accessing module 504 accesses a set of communication instructions associated with an incoming communication request. The set of communication instructions may include individual instructions and/or commands that dictate the actions to be performed by the cloud-based communication platform 108 in response to receiving an incoming communication request. The set of communication instructions may be a programming script that is in a scripting language (e.g., TwiML) provided by the cloud-based communication platform 108 for use by its customers. For example, the scripting language may include specific commands for invoking a set of features and functionality provided by the cloud-based communication platform 108.

In some embodiments, the set of communication instructions may be provided to the cloud-based communication platform 108 along with an incoming communication request received by the receiving module 502. Accordingly, the communication instruction accessing module 504 may access the set of communication instructions directly from the incoming communication request and/or from the receiving module 502.

Alternatively, the communication instruction accessing module 504 may access the set of communication instructions from a data storage of the cloud-based communication platform 108. For example, a customer may provide the set of communication instructions to the cloud-based communication platform 108, which is then stored in the data storage and associated with the customer's account and/or specific endpoint identifiers allocated to the customer. Accordingly, the communication instruction accessing module 504 may identify the account associated with an incoming communication request and access the set of communication instructions associated with the account. The communication instruction accessing module 504 may identify the customer from the incoming communication request, such as based on a contact identifier used to initiation the incoming communication request, a customer computing system 106 from which the communication request was received, and/or data included in the communication request that identifies the customer.

In some embodiments, the communication instruction accessing module 504 may access the set of communication instructions from a network location defined by the customer. For example, the customer may provide the cloud-based communication platform 108 with a resource identifier (e.g., Uniform Resource Identifier (URI)) that identifies the network location from which the set of communication instructions may be accessed. The resource identifier may be stored in the data storage and associated with the customer's account and/or specific endpoint identifiers allocated to the customer. Alternatively, the resource identifier may be provided to the cloud-based communication platform 108 in the communication request received by the receiving module 502. In any case, the communication instruction accessing module 504 uses the resource identifier to access the set of communication instructions from the identified network location.

The communication instruction accessing module 504 provides the accessed set of communication instructions to the executing module 506. In turn, the executing module 506 executes the individual instructions and/or commands included in the set of communication instructions. In this way, the cloud-based communication platform 108 allows for customization of the features and functionality it provides to its customers. For example, a customer may configure the set of communication instructions as desired to leverage the desired features and functionality provided by the cloud-based communication platform 108. Accordingly, execution of the set of communication instructions by the executing module 506 provides customized performance of the communication services provided by the cloud-based communication platform 108 according to the customer's specific needs.

In some embodiments, the set of communications instructions may include command verbs that reference a set of instructions that are stored in the command code registry 518. In response to detecting a command verb, the executing module 506 communicates with the command code registry 518 to access and execute the set of instructions referenced by the communication verb.

Execution of some commands may cause the executing module 506 to communicate with other modules of the cloud-based communication platform 108 to perform a requested action. For example, a command to initiate a communication session causes the executing module 506 to communicate with the communication session management module 508 to initiate the communication session. As another example, a command to initiate a real-time media stream causes the communication module to communicate with the media stream management module 512 to initiate the real-time media stream.

An example of command to initiate a real-time media stream is shown below:

```
<Response>
<Start>
<Stream url="wss://mystream.ngrock.io/audiostream"/>
</Start>
</Response>
```

In this example the code includes a command to start a stream and indicates the destination address.

The communication session management module 508 orchestrates management of communication sessions facilitated by the cloud-based communication platform 108. For example, the communication session management module 508 generates an instance of a communication session facilitation module 510 to facilitate the communication session. An instance of the communication session facilitation module 510 facilitates transmission of media between client devices 102, 104. For example, the communication session facilitation module 510 receives media from each client device 102, 104 participating in the communication session and transmits the received media to the other client devices 102, 104 participating in the communication session.

The communication session management module 508 the provides the generated instance of the communication session facilitation module 510 with data identifying the client devices 102, 104 participating in the communication session. The communication session facilitation module 510 may use the provided data to communicate with and establish communication channels with the participating client devices 102, 104. The established communication channels allow for the transmission of media between the communication session facilitation module 510 and the participating client devices 102, 104.

The media stream management module 512 orchestrates management of real-time media streams. For example, the media stream management module 512 generates an instance of a media stream facilitation module 514 to facilitate the real-time media stream. An instance of the media stream facilitation module 514 facilitates transmission of a real-time media stream to a designated network destination. For example, the media stream facilitation module 514 receives media from the communication session facilitation module 510 facilitating the communication session and transmits the received media to the network destination.

The media stream management module 512 communicates with the communication session facilitation module 510 to cause transmission of the media stream to the media stream facilitation module 514. For example, the media stream management module 512 provides the communication session facilitation module 510 with data identifying the media stream facilitation module 514 to which the media is to be transmitted, as well as data identifying the type of media to include in the stream. The media stream management module 512 also provides the media stream facilitation module 514 with data identifying the communication session facilitation module 510 from which the media will be received, as well as data identifying the network destination to which the media stream facilitation module 514 is to transmit the received media as part of a real-time media stream.

The media stream connector module 516 manages functionality related to providing media stream connectors to integrate third-party services. To utilize a third-party feature, a customer establishes a real time media stream to a network destination of the third-party where the third-party feature is implemented and potentially integrates the functionality of the third-party into the application or services of the customer. To simplify this process, the media stream connector module 516 provides media stream connectors that allow for easy integration of third-party features. A media stream connector is a command or set of commands that enables a customer to utilize a feature provided by the third party. For example, the media stream connected is written using the scripting language (e.g., TwiML) provided by the cloud-based communication platform 108. A customer may simply add the media stream connecter into a set of communication instructions associated with the customer's account to integrate the feature provided by the third-party into their communication services. For example, the media stream connector may cause the cloud-based communication service 108 to initiate a real-time media stream to a network destination of the third-party, where the third-party feature is provided.

The media stream connector module 516 provides an online resource (e.g., app store, online marketplace, etc.) through which customers may search for and download desired media stream connectors. A customer wishing to implement a third-party service may navigate to the online resource (e.g., marketplace) provided by the media stream connector module 516, where the media stream connector associated with the third-party service may be accessed and/or implemented into communication services provided to the customer. For example, the media stream connector may be downloaded and/or installed into a set of communication instructions associated with the customer's account. As another example, source code of the media stream connector may be copied from the marketplace and pasted or otherwise transferred into the set of communication instructions associated with the customer's account.

In some embodiments, the media stream connector is the entirety of the programming code used to initiate a media stream to a third-party system. For example, the media stream connector provides the entirety of the commands, parameters, etc., to cause initiation of a media stream to the third-party service. Alternatively, the commands, parameters, etc., to cause initiation of a media stream to the third-party service are stored in a command code registry 518 and the media stream connector code includes a unique identifier that references the corresponding code stored in the command code registry 518. Using a command code registry to implement a real-time media stream may simplify the process by which customer implement features provided by a third-party.

An example of a media stream connector using a unique identifier is below.

```
<Response>
<Start>
<Stream connectorSid=÷123456" />
</Start>
<Dial><Conference> xyz conference </Conference></Dial>
</Response>
```

In this example the media stream connector includes a command to start a real-time media stream however includes data identifying the corresponding code stored in the command code registry 518, rather than specifying the network destination. This allows the third-party service to modify the destination of the third-party service without interrupting service to a customer that utilizes the features provided by the third-party service. For example, the third-party service may simply modify the media stream connector code stored in the command code registry 518 to update the destination. A media stream connector integrated into a set of communication instructions will continued to work as expected as it references the location of the corresponding code stored in the command code registry 518, which has been updated to the new network destination.

Figure 6:
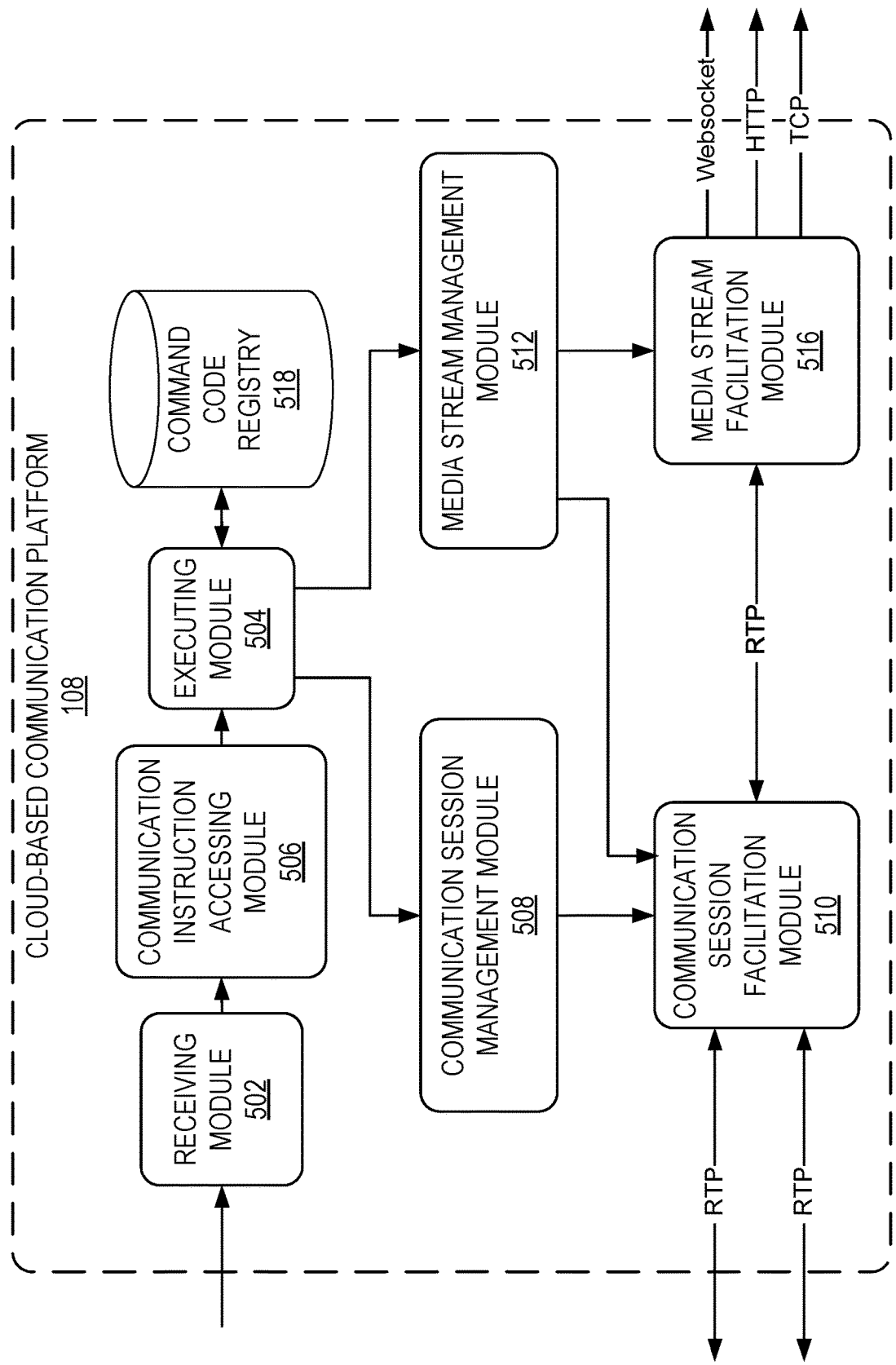
FIG. 6 shows communications within a cloud-based communication platform for initiating a real-time media stream, according to some example embodiments.

FIG. 6 shows communications within a cloud-based communication platform 108 for initiating a real-time media stream. As shown, the receiving module 502 receives an incoming communication request to establish communication sessions. An incoming communication request may be initiated by a customer or by an end user. For example, the receiving module 502 may receive an incoming communication request from a customer computing system 106 associated with a customer of the cloud-based communication platform 108. In this type of embodiment, the incoming communication request may be initiated programmatically, such as by using an Application Programming Interface (API) command.

In some embodiments, the incoming communication request may be received directly from an end user rather that from the customer computing system 106. For example, a user may use a contact identifier (e.g., phone number) allocated to a customer of the cloud-based communication platform 108 to initiate a communication session. Accordingly, the incoming communication request may be received from a telecommunication carrier associated with the client device 102 via a public switched telephone network (PSTN).

In some embodiments, the incoming communication request may include additional data for use by the cloud-based communication platform 108. For example, incoming communication requests that are received programmatically from a customer computing system 106 using an API command may include data for use by the cloud-based communication platform 108 in managing/directing the incoming communication request. This may include a unique identifier associated with the customer and/or an account of the customer, a set of communication instructions for managing the incoming communication session, and/or a resource identifier identifying a location of the set of communication instructions The receiving module 502 notifies the communication instruction accessing module 504 that an incoming communication request has been received, as well as provides the communication instruction accessing module 504 with any related data. In turn, the communication instruction accessing module 504 accesses a set of communication instructions associated with an incoming communication request. The set of communication instructions may include individual instructions and/or commands that dictate the actions to be performed by the cloud-based communication platform 108 in response to receiving an incoming communication request.

The communication instruction accessing module 504 provides the accessed set of communication instructions to the executing module 506, which executes the individual instructions and/or commands included in the set of communication instructions. In this way, the cloud-based communication platform 108 allows for customization of the features and functionality it provides to its customers.

In some embodiments, the set of communications instructions may include command verbs that reference a set of instructions that are stored in the command code registry 518. In response to detecting a command verb, the executing module 506 communicates with the command code registry 518 to access and execute the set of instructions referenced by the communication verb.

Execution of some commands may cause the executing module 506 to communicate with other modules of the cloud-based communication platform 108 to perform a requested action. For example, a command to initiate a communication session causes the executing module 506 to communicate with the communication session management module 508 to initiate the communication session. As another example, a command to initiate a real-time media stream causes the communication module to communicate with the media stream management module 512 to initiate the real-time media stream.

The communication session management module 508 orchestrates management of communication sessions facilitated by the cloud-based communication platform 108. For example, the communication session management module 508 generates an instance of a communication session facilitation module 510 to facilitate the communication session. For example, the instance of the communication session facilitation module 510 facilitates transmission of media between client devices 102, 104 using a communication protocol, such as a real-time transport protocol (RTP).

The communication session management module 508 provides the generated instance of the communication session facilitation module 510 with data identifying the client devices 102, 104 participating in the communication session. The communication session facilitation module 510 may use the provided data to communicate with and establish communication channels with the participating client devices 102, 104. The established communication channels allow for the transmission of media between the communication session facilitation module 510 and the participating client devices 102, 104.

The media stream management module 512 orchestrates management of real-time media streams. For example, the media stream management module 512 generates an instance of a media stream facilitation module 514 to facilitate the real-time media stream. An instance of the media stream facilitation module 514 facilitates transmission of a real-time media stream to a designated network destination. For example, the media stream facilitation module 514 receives media from the communication session facilitation module 510 and transmits the received media to the network destination.

The media stream facilitation module 514 may transmit the real-time media stream using a variety of media stream transports. A media stream transport is a communication protocol by which a media stream may be established to provide a media stream to a designated network destination. Examples of media stream transports include Websocket, Session Initiation Protocol (SIP), HTTP2, GRPC, etc.

The media stream management module 512 communicates with the communication session facilitation module 510 to cause transmission of the media stream to the media stream facilitation module 514. For example, the media stream management module 512 provides the communication session facilitation module 510 with data identifying the media stream facilitation module 514 to which the media is to be transmitted, as well as data identifying the type of media to include in the real-time media stream and/or the media stream transport to be used to initiate the real-time media stream. The media stream management module 512 also provides the media stream facilitation module 514 with data identifying the communication session facilitation module 510 from which the media will be received, as well as data identifying the network destination to which the media stream facilitation module 514 is to transmit the received media as part of a real-time media stream.

Figure 7:
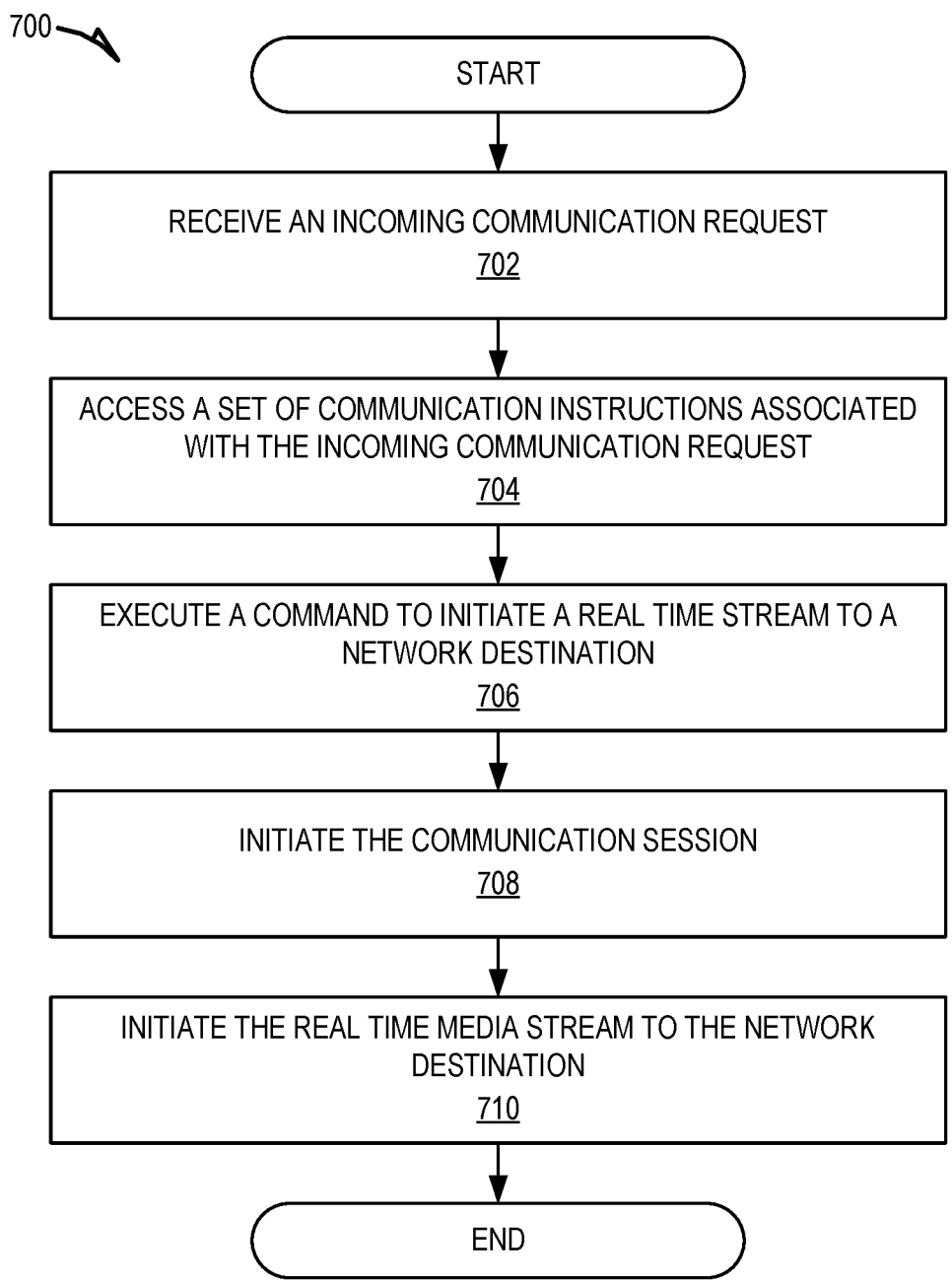
FIG. 7 is a flowchart showing an example method of verifying an incoming communication, according to some example embodiments.

FIG. 7 is a flowchart showing an example method 700 of verifying an incoming communication, according to some example embodiments. The method 700 may be embodied in computer readable instructions for execution by one or more processors such that the operations of the method 700 may be performed in part or in whole by the cloud-based communication platform 108; accordingly, the method 700 is described below by way of example with reference thereto. However, it shall be appreciated that at least some of the operations of the method 700 may be deployed on various other hardware configurations and the method 700 is not intended to be limited to the cloud-based communication platform 108.

At operation 702, the receiving module 502 receives an incoming communication request. The incoming communication request may include additional data for in managing/directing the incoming communication request. This may include a unique identifier associated with the customer and/or an account of the customer, a set of communication instructions for managing the incoming communication session, and/or a resource identifier identifying a location of the set of communication instructions.

At operation 704, the communication instruction accessing module 504 accesses a set of communication instruction associated the incoming communication request. The set of communication instructions may include individual instructions and/or commands that dictate the actions to be performed by the cloud-based communication platform 108 in response to receiving an incoming communication request. The set of communication instructions may be a programming script that is in a scripting language (e.g., TwiML) provided by the cloud-based communication platform 108 for use by its customers. For example, the scripting language may include specific commands for invoking a set of features and functionality provided by the cloud-based communication platform 108.

In some embodiments, the set of communication instructions may be provided to the cloud-based communication platform 108 along with an incoming communication request received by the receiving module 502. Accordingly, the communication instruction accessing module 504 may access the set of communication instructions directly from the incoming communication request and/or from the receiving module 502.

Alternatively, the communication instruction accessing module 504 may access the set of communication instructions from a data storage of the cloud-based communication platform 108. For example, a customer may provide the set of communication instructions to the cloud-based communication platform 108, which is then stored in the data storage and associated with the customer's account and/or specific endpoint identifiers allocated to the customer. Accordingly, the communication instruction accessing module 504 may identify the account associated with an incoming communication request and access the set of communication instructions associated with the account. The communication instruction accessing module 504 may identify the customer from the incoming communication request, such as based on a contact identifier used to initiation the incoming communication request, a customer computing system 106 from which the communication request was received, and/or data included in the communication request that identifies the customer.

In some embodiments, the communication instruction accessing module 504 may access the set of communication instructions from a network location defined by the customer. For example, the customer may provide the cloud-based communication platform 108 with a resource identifier (e.g., Uniform Resource Identifier (URI)) that identifies the network location from which the set of communication instructions may be accessed. The resource identifier may be stored in the data storage and associated with the customer's account and/or specific endpoint identifiers allocated to the customer. Alternatively, the resource identifier may be provided to the cloud-based communication platform 108 in the communication request received by the receiving module 502. In any case, the communication instruction accessing module 504 uses the resource identifier to access the set of communication instructions from the identified network location At operation 706, the executing module 506 executes a command in the set of communication instructions to initiate a real-time stream to a network destination. For example, the set of communications instructions may include a command verb to initiate the real-time media stream. The command verb references a set of instructions that are stored in the command code registry 518. In response to detecting the command verb, the executing module 506 communicates with the command code registry 518 to access and execute the set of instructions referenced by the communication verb.

At operation 708, the communication session management module 508 initiates the communication session. The communication session management module 508 orchestrates management of communication sessions facilitated by the cloud-based communication platform 108. For example, the communication session management module 508 generates an instance of a communication session facilitation module 510 to facilitate the communication session. An instance of the communication session facilitation module 510 facilitates transmission of media between client devices 102, 104. For example, the communication session facilitation module 510 receives media from each client device 102, 104 participating in the communication session and transmits the received media to the other client devices 102, 104 participating in the communication session.

The communication session management module 508 the provides the generated instance of the communication session facilitation module 510 with data identifying the client devices 102, 104 participating in the communication session. The communication session facilitation module 510 may use the provided data to communicate with and establish communication channels with the participating client devices 102, 104. The established communication channels allow for the transmission of media between the communication session facilitation module 510 and the participating client devices 102, 104.

At operation 710, the media stream management module 512 initiates the real-time media stream to the network destination. The media stream management module 512 orchestrates management of real-time media streams. For example, the media stream management module 512 generates an instance of a media stream facilitation module 514 to facilitate the real-time media stream. An instance of the media stream facilitation module 514 facilitates transmission of a real-time media stream to a designated network destination. For example, the media stream facilitation module 514 receives media from the communication session facilitation module 510 facilitating the communication session and transmits the received media to the network destination.

The media stream management module 512 communicates with the communication session facilitation module 510 to cause transmission of the media stream to the media stream facilitation module 514. For example, the media stream management module 512 provides the communication session facilitation module 510 with data identifying the media stream facilitation module 514 to which the media is to be transmitted, as well as data identifying the type of media to include in the stream. The media stream management module 512 also provides the media stream facilitation module 514 with data identifying the communication session facilitation module 510 from which the media will be received, as well as data identifying the network destination to which the media stream facilitation module 514 is to transmit the received media as part of a real-time media stream.

Figure 8:
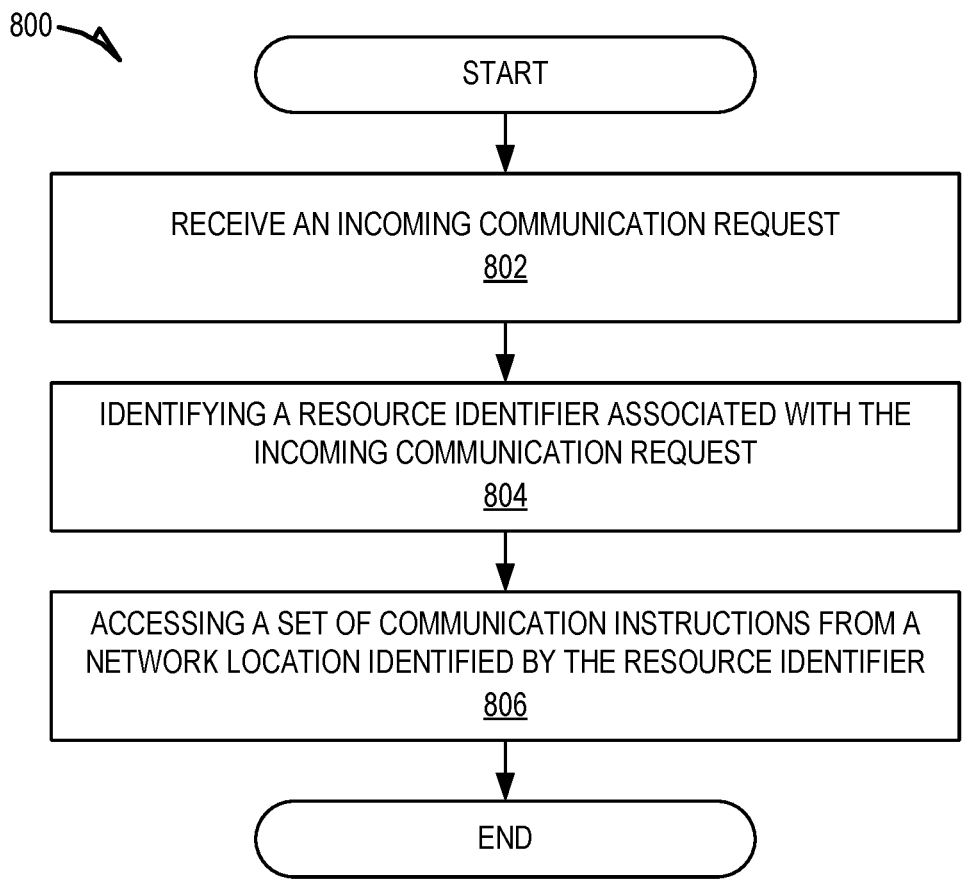
FIG. 8 is a flowchart showing a method for accessing a set of communication instructions, according to some example embodiments.

FIG. 8 is a flowchart showing a method for accessing a set of communication instructions, according to some example embodiments. The method 800 may be embodied in computer readable instructions for execution by one or more processors such that the operations of the method 800 may be performed in part or in whole by the cloud-based communication platform 108; accordingly, the method 800 is described below by way of example with reference thereto. However, it shall be appreciated that at least some of the operations of the method 800 may be deployed on various other hardware configurations and the method 800 is not intended to be limited to the cloud-based communication platform 108.

At operation 802, the receiving module 502 receives an incoming communication request. The incoming communication request may include additional data for in managing/directing the incoming communication request. This may include a unique identifier associated with the customer and/or an account of the customer, a set of communication instructions for managing the incoming communication session, and/or a resource identifier identifying a location of the set of communication instructions.

At operation 804, the communication instruction accessing module 504 identifies a resource identifier associated with the incoming communication request. For example, the communication instruction accessing module 504 may access the resource identifier that was included in the incoming communication request. As another example, the communication instruction accessing module 504 identifies an account associated with the incoming communication request, such as by using a unique account identifier included in the incoming communication request or identifying an account associated with a communication identifier (e.g., phone number) used to initiation the incoming communication request. The communication instruction accessing module 504 may then access a network identifier that has been stored and associated with the account.

At operation 806, the communication instruction accessing module 504 accesses the set of communication instructions from a network location identified by the resource identifier. For example, the communication instruction accessing module 504 transmits a request to the network location to access the set of communication instructions.

Software Architecture

Figure 9:
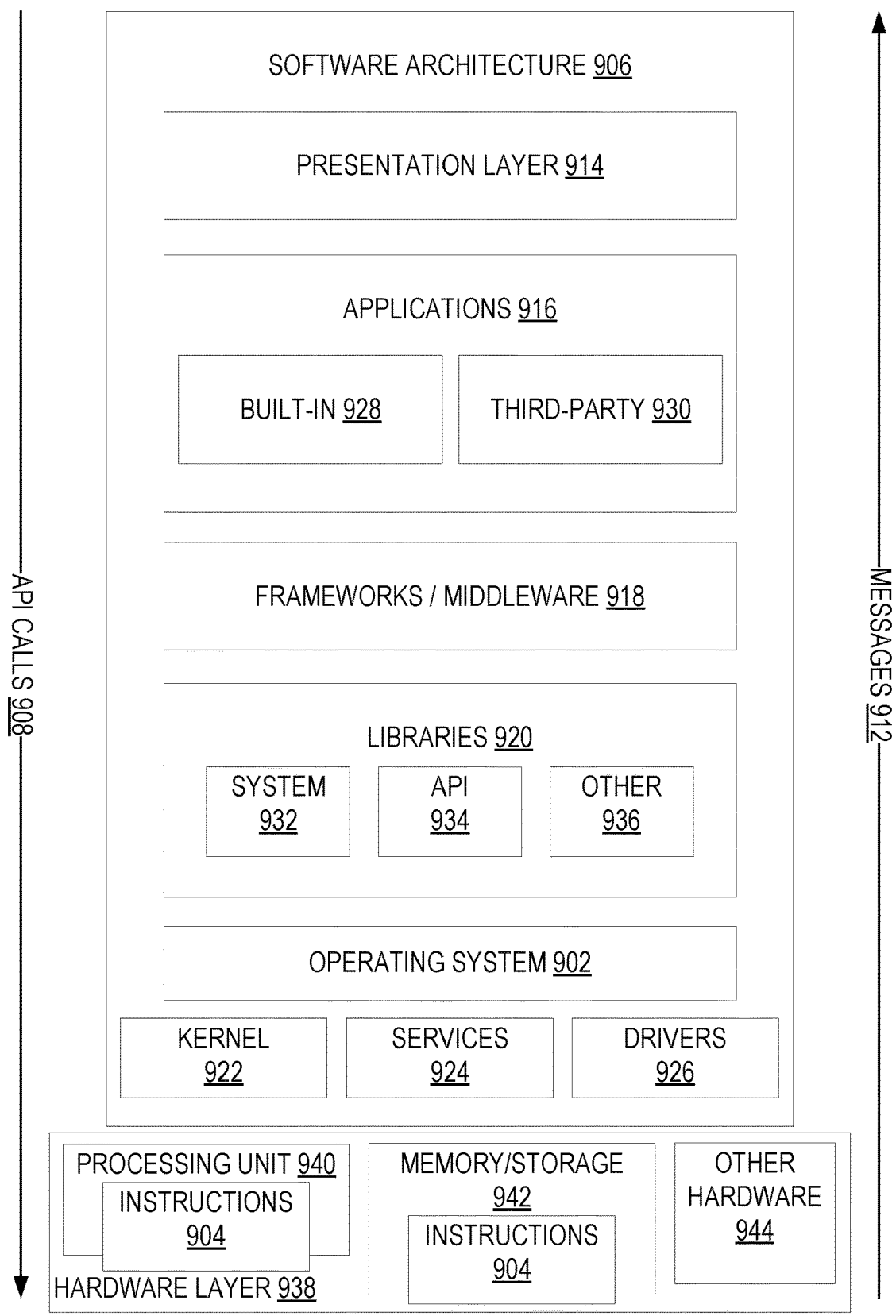
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating an example software architecture 906, which may be used in conjunction with various hardware architectures herein described. FIG. 9 is a non-limiting example of a software architecture 906 and it will be appreciated that many other architectures may be implemented to facilitate the functionality described herein. The software architecture 906 may execute on hardware such as machine 1000 of FIG. 10 that includes, among other things, processors 1004, memory 1014, and (input/output) I/O components 1018. A representative hardware layer 938 is illustrated and can represent, for example, the machine 1000 of FIG. 10. The representative hardware layer 938 includes a processing unit 940 having associated executable instructions 904. Executable instructions 904 represent the executable instructions of the software architecture 906, including implementation of the methods, components, and so forth described herein. The hardware layer 938 also includes memory and/or storage modules 942, which also have executable instructions 904. The hardware layer 938 may also comprise other hardware 944.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke application programming interface (API) calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924, and/or drivers 926). The libraries 920 may include system libraries 932 (e.g., C standard library) that may provide functions such as memory allocation functions, string manipulation functions, mathematical functions, and the like. In addition, the libraries 920 may include API libraries 934 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 936 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system 902 or platform.

The applications 916 include built-in applications 928 and/or third-party applications 930. Examples of representative built-in applications 928 may include, but are not limited to, a contacts application, a browser application, a book reader application, a location application, a media application, a messaging application, and/or a game application. Third-party applications 930 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 930 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
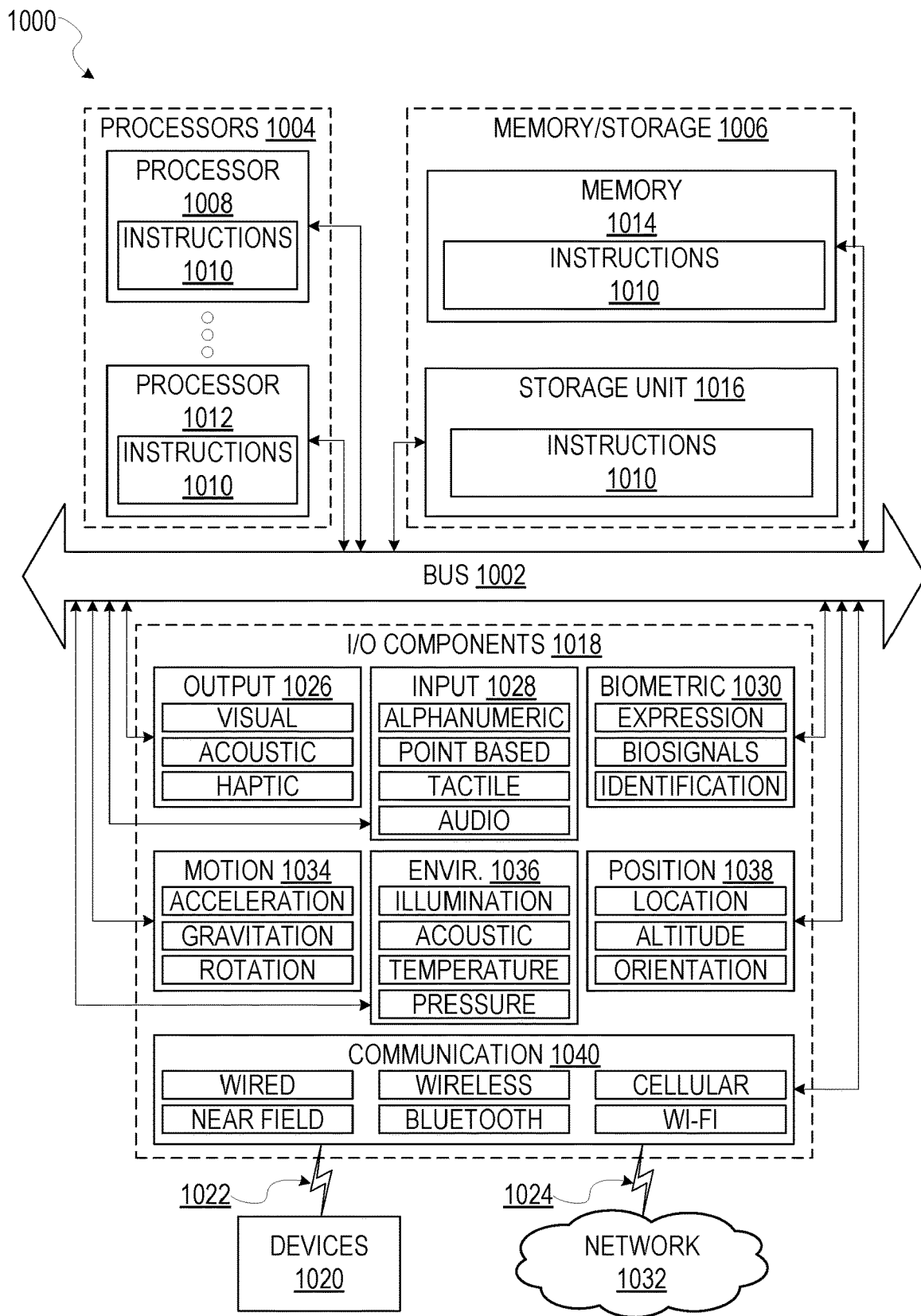
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions 904 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

"CLIENT DEVICE" in this context refers to any machine 1000 that interfaces to a communications network 1032 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors 1004 (sometimes referred to as "cores") that may execute instructions 1010 contemporaneously.

What is claimed is:

1. A method comprising:
   receiving, by a cloud-based communication platform, an incoming communication request to establish a communication session;
   executing a set of communication instructions associated with the incoming communication request, the set of communication instructions including a command to execute a real-time media stream in relation to the communication session, the command including data designating a network destination to receive the real-time media stream;

initiating the communication session between at least a first client device and a second client device; and initiating the real-time media stream to the network destination, the real-time media stream concurrently transmitting at least a portion of the media transmitted between the first client device and the second client device to the network destination;

wherein the network destination is a computing system associated with a third-party service that provides a first service in relation to the portion of the media included in the real-time media stream;

wherein the third-party service provides output data to a computing system associated with a first account of the cloud-based communication platform, the output data having been generated by the third-party service as a result of providing the first service in relation to the portion of the media included in the real-time media stream, the communication session being facilitated by the cloud-based communication platform for the first account.

2. The method of claim 1, wherein the command to execute the real-time media stream further comprises data identifying a subset of media transmitted as part of the communication session to be included in the real-time media stream.

3. The method of claim 1, wherein the network destination is a computing system associated with a first account of the cloud-based communication platform, the communication session being facilitated by the cloud-based communication platform for the first account.

4. The method of claim 1, further comprising:
receiving, from the third-party service, a media stream connector for utilizing the first service provided by the third-party service, the media stream connector including the command to initiate real-time media streams for communication session executed in relation to the application; and
providing the media stream connector to customers of the cloud-based communication platform is a user interface facilitated by the cloud-based communication platform.

5. The method of claim 1, wherein the set of communication instructions is received along with the incoming communication request to establish the communication session.

6. The method of claim 1, further comprising:
identifying a resource identifier associated with the incoming communication request, the resource identifier identifying a location of the set of communication instructions; and
accessing the set of communication instructions based on the resource identifier associated with the incoming communication request.

7. The method of claim 6, wherein identifying the resource identifier associated with the incoming communication request comprises:
identifying the resource identifier assigned to an endpoint identifier used to initiate the incoming communication request.

8. The method of claim 1, wherein the command to execute the real-time media stream identifies a first media stream transport from a plurality of media stream transports for use in establishing the real-time media stream to the network destination, each media stream transport from the plurality of media stream transports being a communication protocol by which real-time media streams may be established.

9. A cloud-based communication platform comprising:
one or more computer-processors; and
one or more computer-readable mediums storing instructions that, when executed by the one or more computer-processors, cause the cloud-based communication platform to perform operations comprising:
receiving an incoming communication request to establish a communication session;
executing a set of communication instructions associated with the incoming communication request, the set of communication instructions including a command to execute a real-time media stream in relation to the communication session, the command. including data designating a network destination to receive the real-time media stream;
initiating the communication session between at least a first client device and a second client device; and
initiating the real-time media, stream to the network. destination, the real-time media stream concurrently transmitting at least a portion of the media transmitted between the first client device and the second client device to the network destination;
wherein the network destination is a computing system associated with a third-party service that provides a first service in relation to the portion of the media included in the real-time media stream;
wherein the third-party service provides output data to a computing system associated with a first account of the cloud-based communication platform, the output data having been generated by the third-party service in relation to the portion of the media included in the real-time media stream;
wherein the third-party service provides output data to a computing system associated with a first account of the cloud-based communication platform, the output data having been generated by the third-party serviced as a result of providing the first service in relation to the portion of the media included in the real-time media stream, the communication session being facilitated by the cloud-based communication platform for the first account.

10. The cloud-based communication platform of claim 9, wherein the command to execute the real-time media stream further comprises data identifying a subset of media transmitted as part of the communication session to be included in the real-time media stream.

11. The cloud-based communication platform of claim 9, wherein the network destination is a computing system associated with a first account of the cloud-based communication platform, the communication session being facilitated by the cloud-based communication platform for the first account.

12. The cloud-based communication platform of claim 9, the operations further comprising:
receiving, from the third-party service, a media stream connector for utilizing the first service provided by the third-party service, the media stream connector including the command to initiate real-time media streams for communication session executed in relation to the application; and
providing the media stream connector to customers of the cloud-based communication platform is a user interface facilitated by the cloud-based communication platform.

13. The cloud-based communication platform of claim 9, wherein the set of communication instructions is received along with the incoming communication request to establish the communication session.

14. The cloud-based communication platform of claim 9, the operations further comprising:

identifying a resource identifier associated with the incoming communication request, the resource identifier identifying a location of the set of communication instructions; and accessing the set of communication instructions based on the resource identifier associated with the incoming communication request.

15. The cloud-based communication platform of claim 14, wherein identifying the resource identifier associated with the incoming communication request comprises:

identifying the resource identifier assigned to an endpoint identifier used to initiate the incoming communication request.

16. A non-transitory computer-readable medium storing instructions that, when executed by one or more computer-processors of a cloud-based communication platform, cause the cloud-based communication platform to perform operations comprising:

receiving an incoming communication request to establish a communication session;

executing a set of communication instructions associated with the incoming communication request, the set communication instructions including a command to execute a real-time media stream in relation to the communication session, the command including data designating a network destination to receive the real-time media, stream;

initiating the communication session between at least a first client device and a second client device; and initiating the real-time media stream to the network destination, the real-time media stream concurrently transmitting at least a portion of the media transmitted between the first client device and the second client device to the network destination;

wherein the network destination is a computing system associated with a third-party service that provides first service in relation to the portion of the media included in the real-time media stream;

wherein the third-party service provides output data to a computing system associated with a first account of the cloud-based communication platform, the output data having been generated by the third-party service as a result of providing the first service in relation to the portion of the media included in the real-time media stream, the communication session being facilitated by the cloud-based communication platform for the first account.

* * * * *

UNITED STATES PATENT AND TRADEMARK OFFICE
CERTIFICATE OF CORRECTION

PATENT NO. : 11,128,679 B2  
APPLICATION NO. : 16/985600  
DATED : September 21, 2021  
INVENTOR(S) : Gutta et al.

Page 1 of 1

It is certified that error appears in the above-identified patent and that said Letters Patent is hereby corrected as shown below:

In the Claims

In Column 33, Line 40, in Claim 4, delete "is" and insert --via-- therefor

In Column 34, Line 13, in Claim 9, delete "command." and insert --command-- therefor In Column 34, Line 18, in Claim 9, delete "media," and insert --media-- therefor In Column 34, Line 18, in Claim 9, delete "network." and insert --network-- therefor In Column 34, Lines 30-36, in Claim 9, after "service", delete "in relation to the portion of the media included in the real-time media stream;
wherein the third-party service provides output data to a computing system associated with a first account of the cloud-based communication platform, the output data having been generated by the third-party serviced"

In Column 34, Line 62, in Claim 12, delete "is" and insert --via-- therefor

In Column 36, Line 4, in Claim 16, delete "media," and insert --media-- therefor In Column 36, Line 13, in Claim 16, before "first", insert --a--

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*